United States Patent
Adema et al.

(10) Patent No.: US 9,810,891 B2
(45) Date of Patent: Nov. 7, 2017

(54) DUAL LIGHT SOURCE ENHANCED INTEGRATION SYSTEM

(71) Applicant: CHRISTIE DIGITAL SYSTEMS USA, INC., Cypress, CA (US)

(72) Inventors: Daniel Robert Adema, Kitchener (CA); Joseph Ma, Waterloo (CA); Graham Hill, Waterloo (CA)

(73) Assignee: CHRISTIE DIGITAL SYSTEMS USA, INC., Cypress, CA (US)

(*) Notice: Subject to any disclaimer, the term of this patent is extended or adjusted under 35 U.S.C. 154(b) by 113 days.

(21) Appl. No.: 14/687,133

(22) Filed: Apr. 15, 2015

(65) Prior Publication Data

US 2016/0306150 A1    Oct. 20, 2016

(51) Int. Cl.
| | |
|---|---|
| *G02B 19/00* | (2006.01) |
| *G02B 27/09* | (2006.01) |
| *G03B 21/20* | (2006.01) |
| *F21V 8/00* | (2006.01) |

(52) U.S. Cl.
CPC ....... *G02B 19/0028* (2013.01); *G02B 6/0096* (2013.01); *G02B 19/0047* (2013.01); *G02B 27/0994* (2013.01); *G03B 21/208* (2013.01); *G03B 21/2013* (2013.01)

(58) Field of Classification Search
CPC ............ F21Y 2113/10; G02B 19/0028; G02B 19/0047; G02B 27/0994; G03B 21/2013; G03B 21/208; H04N 9/3105; H04N 9/3108
USPC ................................................. 359/629, 638
See application file for complete search history.

(56) References Cited

U.S. PATENT DOCUMENTS

| | | | |
|---|---|---|---|
| 1,942,372 A | 1/1934 | Miller | |
| 8,011,810 B2 | 9/2011 | Ma et al. | |
| 8,011,815 B2 | 9/2011 | Zhou et al. | |
| 2001/0048562 A1* | 12/2001 | Bartlett | G02B 27/143 359/636 |
| 2005/0134811 A1* | 6/2005 | Magarill | H04N 9/3105 353/94 |
| 2008/0055903 A1 | 3/2008 | Akiyama | |
| 2008/0247164 A1* | 10/2008 | Lee | G02B 27/0994 362/241 |
| 2009/0147152 A1 | 6/2009 | Ishii | |

(Continued)

OTHER PUBLICATIONS

European Search Opinion dated Jan. 9, 2016, by EPO, re European Patent Application No. 16165444. 5 pages.

(Continued)

*Primary Examiner* — Sean Gramling
*Assistant Examiner* — Gerald J Sufleta, II
(74) *Attorney, Agent, or Firm* — Perry + Currier, Inc.

(57) ABSTRACT

A dual light source enhanced integration system is provided. The system comprises: a first light source and a second light source with overlapping spectra; a light integrator configured to integrate light and having a first light entrance face and a second light entrance face; and, a beamsplitter system configured to about equally distribute light from each of the first light source and the second light source to each of the first light entrance face and the second light entrance face, such that the light from each of the first light source and the second light source is about equally combined at each of the first light entrance face and the second light entrance face.

15 Claims, 9 Drawing Sheets

(56) References Cited

U.S. PATENT DOCUMENTS

2012/0274908 A1    11/2012  Ma et al.
2014/0268330 A1*   9/2014   Perkins .................. G02B 27/14
                                                      359/485.01

OTHER PUBLICATIONS

Examination Report (94(3)EPC) dated Jun. 20, 2017, by EPO, re European Patent Application No. EP16165444.7. 8 pages.
Extended European Search Report dated Sep. 1, 2016 for European Patent Application No. 10165444.7.

* cited by examiner

DUAL LIGHT SOURCE ENHANCED INTEGRATION SYSTEM

FIELD

The specification relates generally to optical systems, and specifically to a dual light source enhanced integration system.

BACKGROUND

Existing solutions for homogenization of light use integrating rods or flys-eye lenses, which add length to the illumination path. Such existing solutions also use light sources (such as lamps) of similar brightness and colour uniformity to simplify the requirements of light homogenization. However, when the illumination sources are fundamentally different in colour or intensity, the existing integrator solutions may not acceptably integrate the two light sources into a common beam. An example of an application with fundamentally different colour sources is a projector with a colour-deficient primary source that requires additional colour (such as red) to achieve a desired output colour point. Such issues become even more problematic when the respective spectrum of the illumination sources overlap.

SUMMARY

The present specification is directed to a system in which light from two light sources emitting different colours, and overlapping spectra, are integrated using a combination of a beamsplitter (for example a 50/50 beamsplitter and/or a polarizing beamsplitter) and an integrator that integrates the light from the two light sources after it is combined by the beamsplitter.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this specification, language of "at least one of X, Y, and Z" and "one or more of X, Y and Z" can be construed as X only, Y only, Z only, or any combination of two or more items X, Y, and Z (e.g., XYZ, XY, YZ, ZZ, and the like). Similar logic can be applied for two or more items in any occurrence of "at least one . . . " and "one or more . . . " language.

An aspect of the present specification provides a system comprising: a first light source configured to emit a first given colour of light; a second light source configured to emit a second given colour of light, the second given colour different from the first given colour, respective spectra for each of the first colour and the second colour overlapping with each other; a light integrator comprising: at least one body configured to integrate light, the at least one body comprising a respective length and a light egress end; a first light entrance device comprising a first light entrance face, the first light entrance device located distal the light egress end; and a second light entrance device comprising a second light entrance face parallel the first light entrance face; each of the first light entrance device and the second light entrance device configured to receive light and deflect the light into the at least one body and towards the light egress end; and, a beamsplitter system configured to about equally distribute light from each of the first light source and the second light source to each of the first light entrance face and the second light entrance face, such that the light from each of the first light source and the second light source is about equally combined at each of the first light entrance face and the second light entrance face.

The beamsplitter system can be further configured to: transmit about half of the first given colour of light from the first light source to the first light entrance face; reflect a remaining half of the first given colour of light from the first light source to the second light entrance face; transmit about half of the second given colour of light from the second light source to the second light entrance face; and, reflect a remaining half of the second given colour of light from the second light source to the first light entrance face.

The beamsplitter system can comprise a beamsplitter and one or more optical components.

The beamsplitter system can comprise: one or more of a 50/50 beamsplitter and a polarizing beamsplitter; and one or more optical components.

The beamsplitter system can comprise a beamsplitter and one or more of: at least one mirror; at least one flat mirror; at least one curved surface mirror; at least one lens; and at least one set of lenses.

The beamsplitter system can comprise a beamsplitter, a first mirror and second mirror, each of the first mirror and the second mirror configured to reflect respective light from the beamsplitter into a respective light entrance face.

The beamsplitter system can comprise a beamsplitter, a first set of lenses and second set of lenses, each of the first set of lenses and the second set of lenses configured to direct respective light from the beamsplitter into a respective light entrance face.

The first light entrance face and the second light entrance face can be facing in opposite directions.

The first light entrance face and the second light entrance face can be facing in a same direction.

The first light entrance face and the second light entrance face can be facing in opposite directions, and the light sources and beamsplitter systems can be physically symmetric with respect to a longitudinal axis of the at least one body.

The first light entrance and the second light entrance can be laterally displaced from one another along a longitudinal axis of the respective length and perpendicular an axis normal to the first light entrance face.

Each of the first light source and the second light source can be configured to emit collimated light.

The system can further comprise optical components configured to collimate light of each of the first light source and the second light source.

Lengths of respective light paths from each of the first light source and the second light source to each of the first light entrance face and the second light entrance face can be about equal.

Etendues of each of the first light source and the second light source can be within about 40% of one another.

The at least one body can comprise: a first body configured to convey the light from the first light entrance device towards the light egress end; and a second body configured to convey the light from the second light entrance device towards the light egress end.

BRIEF DESCRIPTIONS OF THE DRAWINGS

Embodiments are described with reference to the following figures, in which.

DETAILED DESCRIPTION OF THE EMBODIMENTS

Figure 1:
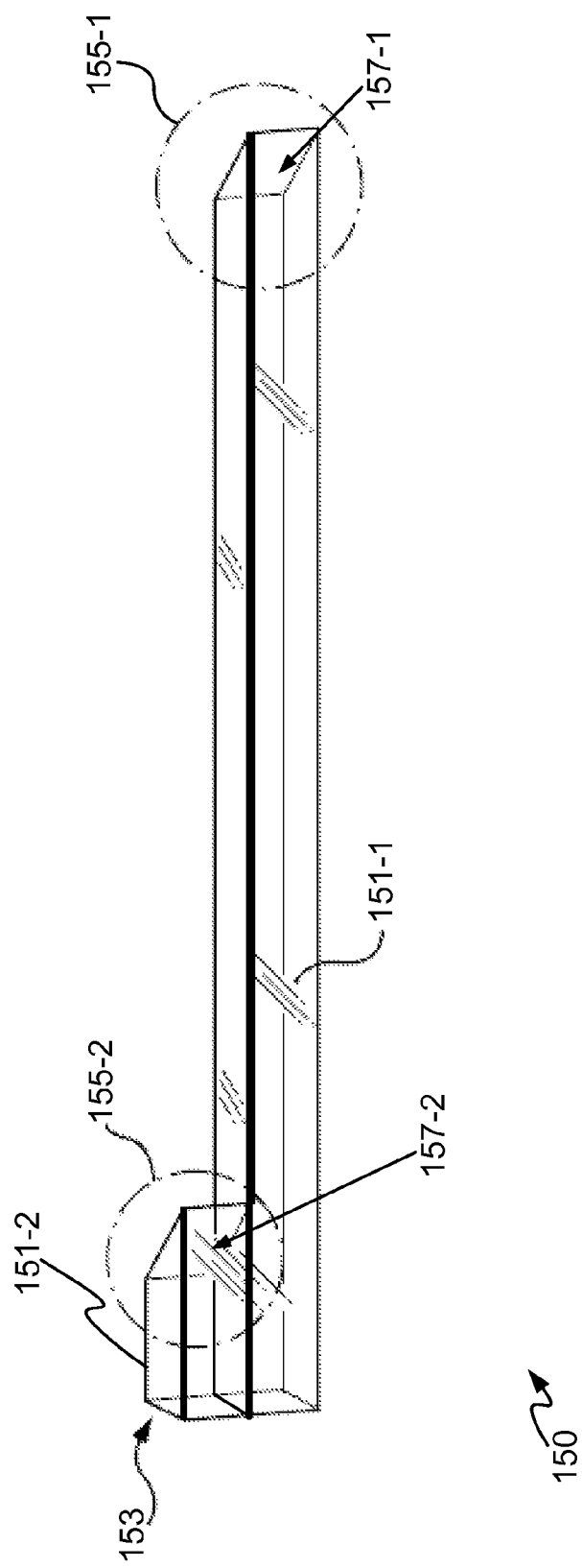
FIG. 1 depicts an integrator, according to non-limiting implementations.

Attention is directed to FIG. 1 which depicts a light integrator 150 comprising: at least one body 151-1, 151-2 configured to integrate light, at least one body 151-1, 151-2 comprising a respective length and a light egress end 153; a first light entrance device 155-1 comprising a first light entrance face 157-1, first light entrance device 155-1 located distal light egress end 153; and a second light entrance device 155-2 comprising a second light entrance face 157-2 parallel first light entrance face 157-1; each of first light entrance device 155-1 and second light entrance device 155-2 configured to receive light and deflect the light into at least one body 151-1, 151-1 and towards light egress end 153. Light entrance devices 155-1, 155-2 are interchangeably referred to hereafter, collectively, as light entrance devices 155 and, generically, as a light entrance device 155; similarly, light entrance faces 157-1, 157-2 are interchangeably referred to hereafter, collectively, as light entrance faces 157 and, generically, as a light entrance face 157. In particular, various implementations of light integrator 150 are described in Applicant's co-owned issued U.S. Pat. No. 8,011,815, which is incorporated herein by reference. Indeed, various implementations of light integrator 150 are within the scope of present implementations including implementations where each light entrance face 157 are facing in different directions, in the same direction (as depicted), are located at about a same position along a length of at least one body 151-1, 151-2 and/or at different positions along at least one body 151-1, 151-2 (as depicted). Indeed, as depicted integrator 150 comprises: a first body 151-1 configured to convey the light from first light entrance 155-1 device towards light egress end 153; and a second body 151-2 configured to convey the light from second light entrance device 155-2 towards light egress end 153. However, in other implementations, bodies 151-1, 151-2 can be integrated. Bodies 151-1, 151-2 are interchangeably referred to hereafter, collectively, as bodies 151 and, generically, as a body 151.

Figure 2:
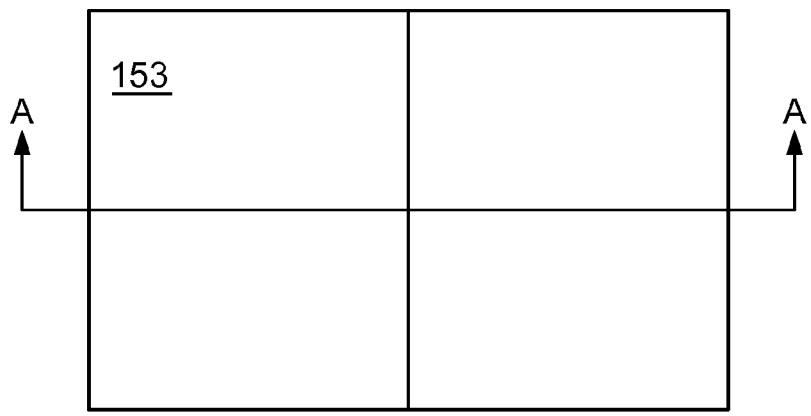
FIG. 2 depicts a light profile through a cross-section of the integrator of FIG. 1 from light sources having different colours and overlapping light spectra, according to non-limiting implementations.
Figure 2:
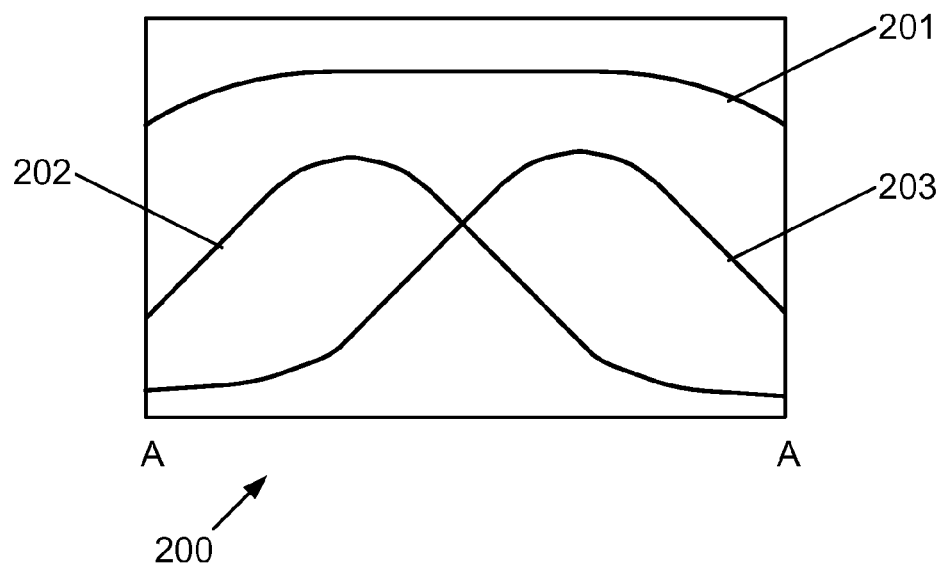

While not depicted, light from different light sources can impinge on each light entrance face 157 and deflect the light into bodies 151-1, 151-2, for example using reflective coatings and/or total internal reflection; bodies 151-1, 151-2 each respectively integrate light received therein before the light exits light egress end 153. However, attention is now directed to FIG. 2, which depicts light egress end 153 of integrator 150, and a profile 200 of light through a section A-A of light egress end 153, assuming that light entering each light entrance device 155 is of a different colour but with spectrums that overlap. As seen in profile 200, which depicts a total profile 201 and profiles 202, 203 showing the intensity of light from the two different sources, variations in colour intensity can occur across the light egress end 153 made up of the exit faces of bodies 151. For example, see profiles 202, 203. The overall light intensity (profile 201) and colour variation (profiles 202, 203) are depicted in FIG. 2 as a function of the distance through section A-A. Such colour variation may not be problematic when light entering each light entrance face 157 is of the same colour and/or of the similar intensities, but when the colour of the multiple light sources entering light entrance devices 155 are substantially different, it causes colour non-uniformity issues, for example in projectors using such integrators.

The situation is exacerbated when the light sources are of different colours, but overlapping spectra. For example, one or more dichroic mirrors can be used to route the light from the different sources to each entrance face 157 of light integrator 150, but as such dichroic mirrors sharply cut off light above or below a given wavelength, light that is in the overlapping area from at least one of the light sources will be lost, which can lead to a decrease in efficiency of a light production system and an increase in heating.

Figure 3:
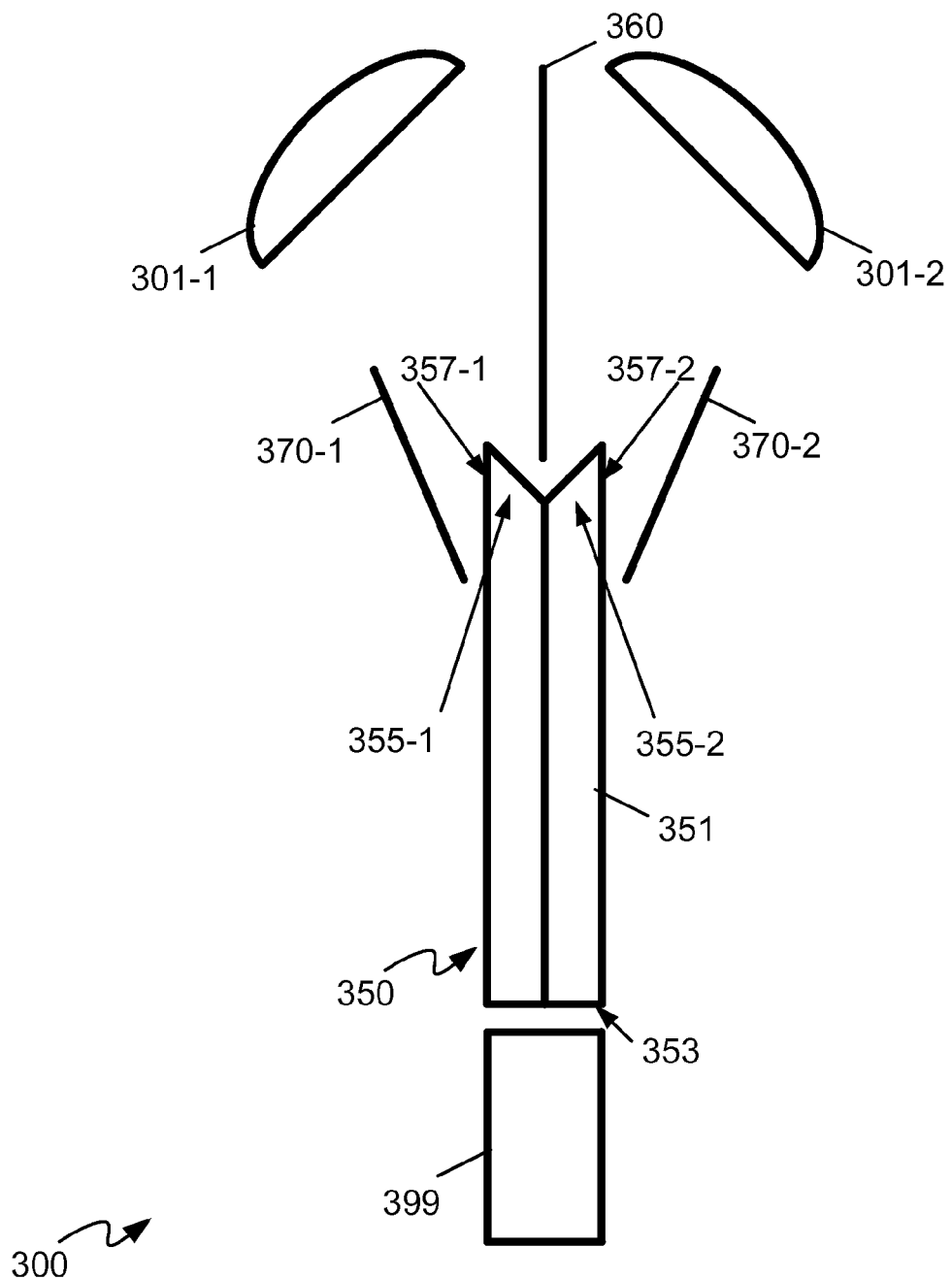
FIG. 3 depicts a schematic diagram of a light integration system, according to non-limiting implementations.

As such, attention is next directed to FIG. 3 which depicts a schematic diagram of a system 300 comprising: a first light source 301-1 configured to emit a first given colour of light; a second light source 301-2 configured to emit a second given colour of light, the second given colour different from the first given colour, respective spectra for each of the first colour and the second colour overlapping with each other; a light integrator 350 comprising: at least one body 351 (only one body is designated for convenience though two bodies are depicted, as with integrator 150) configured to integrate light, least one body 351 comprising a length and a light egress end 353; a first light entrance device 355-1 comprising a first light entrance face 357-1, first light entrance device 355-1 located distal light egress end 353; and a second light entrance device 355-2 comprising a second light entrance face 357-2 parallel first light entrance face 357-1; each of first light entrance device 355-1 and second light entrance device 355-2 configured to receive light and deflect the light into at least one body 351 and towards light egress end 353; and, a beamsplitter system which, as depicted, comprises a beamsplitter 360, a first mirror 370-1 and a second mirror 370-2, the beamsplitter system configured to: about equally distribute light from each of the first light source 301-1 and the second light source 301-2 to each of the first light entrance face 357-1 and the second light entrance face 357-2, such that the light from each of the first light source 301-1 and the second light source 301-2 is about equally combined at each of the first light entrance face 357-1 and the second light entrance face 357-2. In particular, the beamsplitter system is configured to: direct about half of the first given colour of light from first light source 301-1 to first light entrance face 357-1; direct a remaining half of the first given colour of light from first light source 301-1 to second light entrance face 357-2; direct about half of the second given colour of light from second light source 301-2 to second light entrance face 357-2; and, direct a remaining half of the second given colour of light from second light source 301-2 to first light entrance face 357-1. System 300 further comprises an optional integration device 399 located at light egress end 353, integration device 399, which can include, but is not limited to, one or more of an integration rod and a hollow pipe with reflective interior walls. Integration device 399 is generally configured to receive light exiting light egress end 353 and further integrate such light; when such light exits integration device 399, the light can be conveyed to a light modulator and the like, for example in a projector, and the like. While integration device 399 is depicted as detached from integrator 350, in other implementations, integration device 399 can be attached to light egress end 353 of integrator 350.

Light sources 301-1, 301-2 are interchangeably referred to hereafter, collectively, as light sources 301 and, generically, as a light source 301; light entrance devices 355-1, 355-2 are interchangeably referred to hereafter, collectively, as light entrance devices 355 and, generically, as a light entrance device 355; light entrance faces 357-1, 357-2 are interchangeably referred to hereafter, collectively, as light entrance faces 357 and, generically, as a light entrance face 357; and, mirrors 370-1, 370-2 are interchangeably referred to hereafter, collectively, as mirrors 370 and, generically, as a mirror 370.

As depicted each of light sources 301 comprise an elliptical light source, that has an etendue of light emitted therefrom; in general, a physical configuration of each of light sources 301 are similar, including each light source 301 having a similar etendue, however each light source 301 emits a different colour light, for example red light from one light source 301 and green light from the other light source 301.

In contrast to integrator 150, light entrance devices 355 and light entrance faces 357 of integrator 350 are located at about a same distance from light egress end 353 and further first light entrance face 357-1 and second light entrance face 357-2 are facing in opposite directions. Such implementations can be achieved in different ways, for example, while as depicted light entrance faces 357 are back-to-back, in other implementations, light entrance faces 357 can be side-by-side with positions of mirrors 370 adjusted accordingly. In addition, light sources 301 and the beamsplitter system (i.e. beamsplitter 360 and mirrors 370) are physically symmetric with respect to a longitudinal axis of body 351.

Beamsplitter system comprises beamsplitter 360, first mirror 370-1 and second mirror 370-2, each of first mirror 370-1 and second mirror 370-2 configured to reflect respective light from beamsplitter 360 into a respective light entrance face 357 as described hereafter.

In particular, beamsplitter 360 comprises one or more of a 50/50 beam splitter, a polarizing beamsplitter and the like, such that for light impinging on one side of beamsplitter 360, about half of the light is reflected from beamsplitter 360 and half transmitted through beamsplitter 360.

While not depicted in FIG. 3, system 300 can further comprise any suitable frames, rigs and the like for positioning components of system 300. Also, while not depicted, system 300 can comprise a component of a light production system, for example a light production system of a projector and the like.

Figure 4:
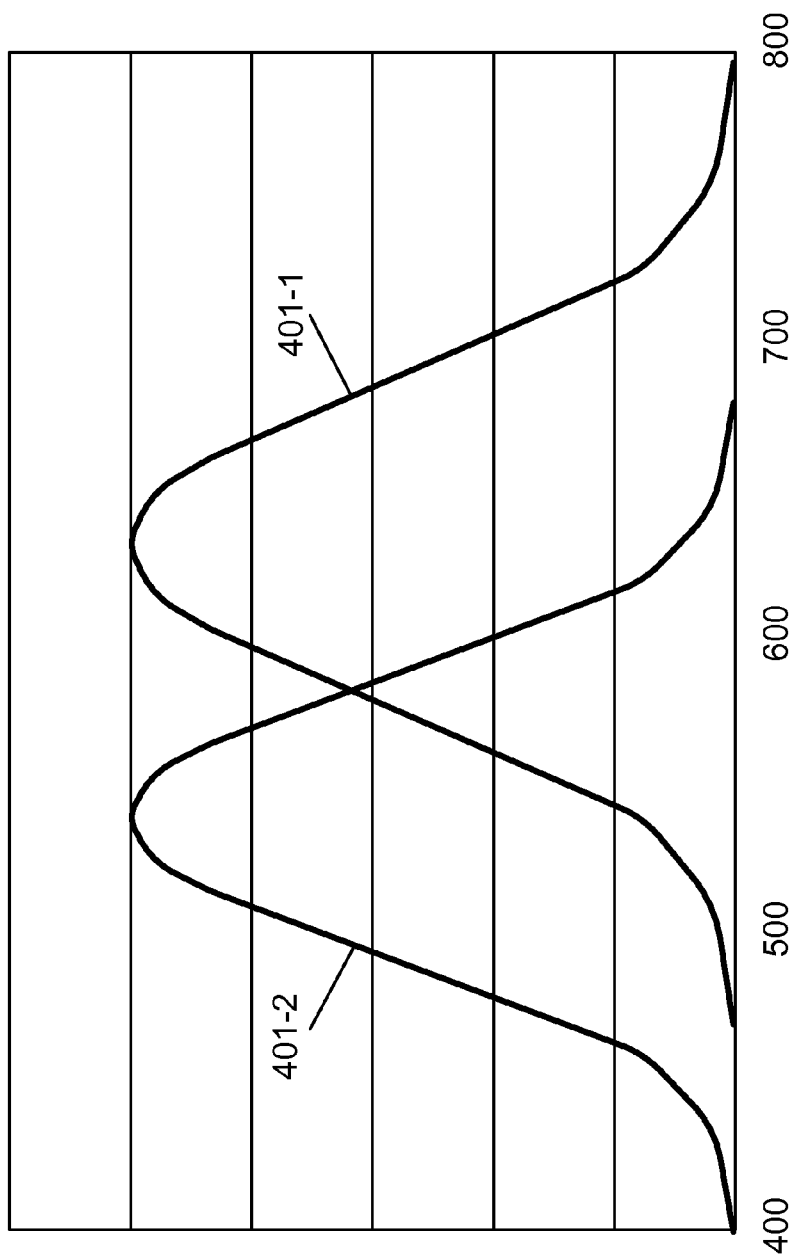
FIG. 4 depicts a schematic diagram of respective light spectra of the light sources in FIG. 3, according to non-limiting implementations.

Furthermore, with reference to FIG. 4, a spectrum 401-1 of light source 301-1 generally overlaps with a spectrum 401-2 of light source 301-2. As depicted, spectrum 401-1 of light source 301-1 generally comprises red light, and spectrum 401-2 of light source 301-2 generally comprises green light, but the lower wavelengths of spectrum 401-1 overlap with the higher wavelengths of spectrum 401-2. As beamsplitter 360 does not distinguish between wavelengths, and merely transits about half of the light from each light source 301 and reflects about half of the light from each light source 301, no light energy is lost due to sharp cut-offs in such reflection and/or transmission, as would occur with a dichroic mirror.

Figure 5:
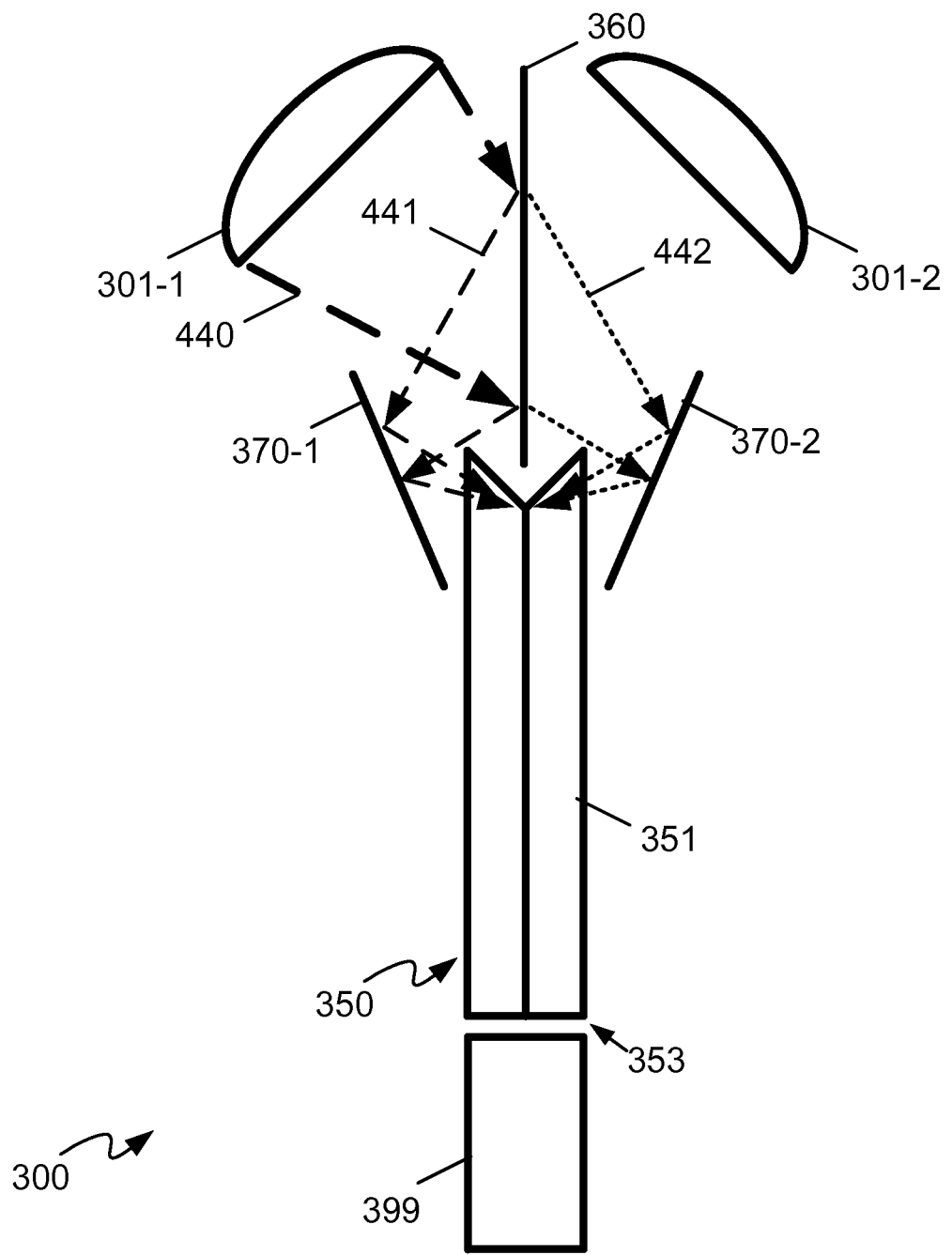
FIG. 5 depicts the system of FIG. 3 in operation, according to non-limiting implementations.
Figure 6:
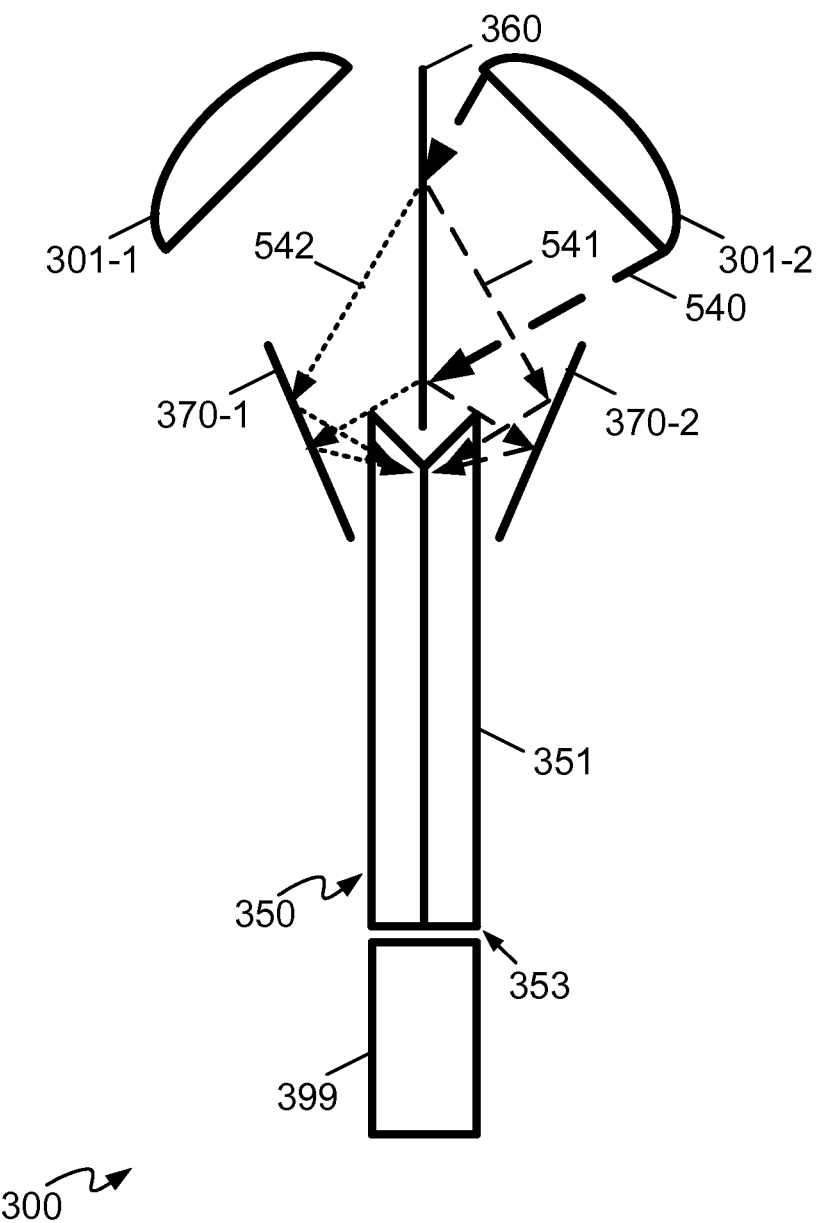
FIG. 6 depicts the system of FIG. 3 in operation, according to non-limiting implementations.

Operation of system 300 is now described with respect to FIGS. 5 and 6, each of which are substantially similar to FIG. 3, with like elements having like numbers, though light entrance devices 355 and light entrance faces 357 are not numerically indicated for clarity, but are appreciated to be nonetheless present. In particular, FIG. 5 depicts paths of light from light source 301-1 through system 300, and FIG. 6 depicts paths of light from light source 301-2 through system 300.

Attention is first directed to FIG. 5 in which light 440 is emitted from light source 301-1, and impinges on beamsplitter 360, which reflects about half of light 440 and transmits about half of light 440 (though a relatively smaller portion of light 440 can be absorbed). Beamsplitter 360 and mirror 370-1 are positioned so that reflected light 441 impinges on mirror 370-1, which reflects light 441 into light entrance face 357-1. Similarly, beamsplitter 360 and mirror 370-1 are further positioned so that transmitted light 442 impinges on mirror 370-2, which reflects light 442 into light entrance face 357-2. Hence, light 440 from light source 301-1 is about equally split between light entrance faces 357.

With reference to FIG. 6, a similar situation occurs for light 540 emitted from light source 301-2, which is of a different colour than light 440 from light source 301-1. For example, light source 301-1 can be configured to emit red light while light source 301-2 can be configured to emit green light.

In any event, light 540 is emitted from light source 301-2, and impinges on beamsplitter 360, which reflects about half of light 540 and transmits about half of light 540. Beamsplitter 360 and mirror 370-2 are positioned so that reflected light 541 impinges on mirror 370-2, which reflects light 541 into light entrance face 357-2. Similarly, beamsplitter 360 and mirror 370-1 are further positioned so that transmitted light 542 impinges on mirror 370-1, which reflects light 542 into light entrance face 357-1. Hence, light 540 from light source 301-2 is about equally split between light entrance faces 357.

Positions and angles of each of light sources 301, beamsplitter 360, mirrors 370 and light entrance faces 357 are selected so that light 440, 540 concurrently travels through system 300 as depicted in FIGS. 5 and 6. In other words, the processes depicted in each of FIGS. 5 and 6, while drawn separately for clarity, are appreciated to be occurring concurrently.

Furthermore, as light sources 301 and the beamsplitter system (i.e. beamsplitter 360 and mirrors 370) are physically symmetric with respect to a longitudinal axis of body 351, lengths of respective light paths from each of first light source 301-1 and second light source 301-2 to each of first light entrance face 357-1 and second light entrance face 357-1 are about equal. Hence, variations in intensity between light sources 301 due to path length scattering are minimized. In other implementations, lengths of respective light paths from each of first light source 301-1 and second light source 301-2 to each of first light entrance face 357-1 and second light entrance face 357-1 can be about within about 30% of one another. However, differences in path length can be increased through the use of one or more optical relay systems along one or more of the respective light paths.

Furthermore, etendue of each light source 301 can be selected to be within about 40% of each other to further minimize differences there between.

In any event, as light sources 301 emit different colours, and as light from each is about equally split between each of light entrance faces 357, light entering both of light entrance faces 357 will have about the same characteristics with regards to at least colour and intensity. Hence, any hot spots that might occur in light exiting light egress end 353 will be similar with respect to at least colour and intensity. Furthermore, any variations in light colour distribution can be reduced using system 300; for example, with reference to FIG. 2, profiles 202, 203 can be reduced and/or peaks in profiles 202, 203 can be reduced and/or a shape of profiles 202, 203 appear similar to profile 201.

Persons skilled in the art will appreciate that there are yet more alternative implementations and modifications possible, and that the above examples are only illustrations of one or more implementations.

Figure 7:
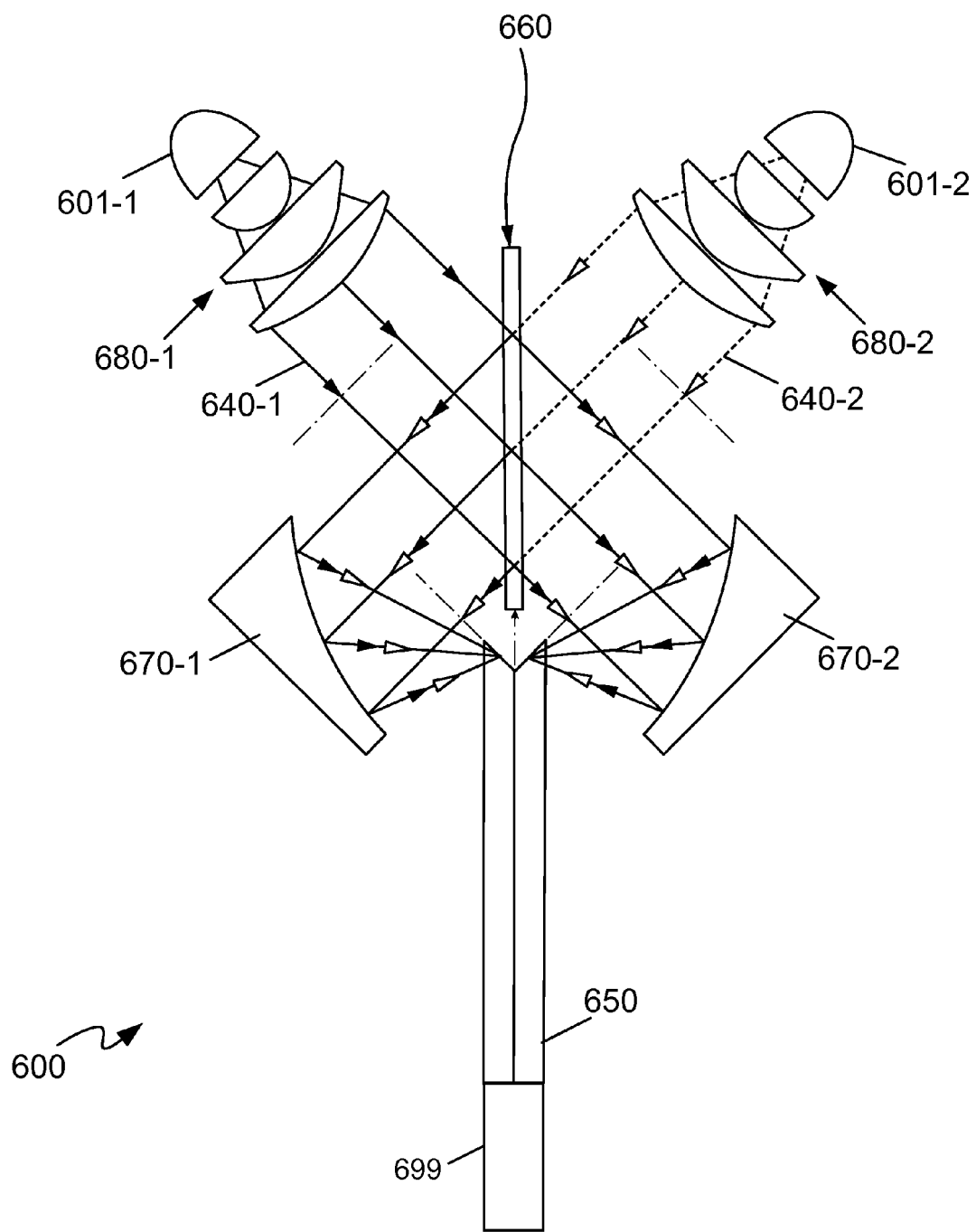
FIG. 7 depicts a schematic diagram of a light integration system, according to alternative non-limiting implementations.

For example, attention is next directed to FIG. 7 which depicts an alternative system 600 that is substantially similar to system 300, with like elements having like numbers, however in a "600" series rather than "300" series. Furthermore, not all features of system 600 are numbered for clarity; for example, an integrator 650, similar to integrator 350 is depicted, however light entrance devices, light entrances faces, a body and a light egress end are not numbered though appreciated to be present.

In any event, system 600 comprises: a first light source 601-1 configured to emit a first given colour of light; a second light source 601-2 configured to emit a second given colour of light, the second given colour different from the first given colour, respective spectra for each of the first colour and the second colour overlapping with each other; a light integrator 650 comprising: a body configured to integrate light, body comprising a length and a light egress end; a first light entrance device comprising a first light entrance face, first light entrance device located distal light egress end; and a second light entrance device comprising a second light entrance face parallel first light entrance face; each of first light entrance device and second light entrance device configured to receive light and deflect the light into body and towards light egress end; and, a beamsplitter system which, as depicted, comprises a beamsplitter 660, a first mirror 670-1, and a second mirror 670-2, the beamsplitter system configured to: about equally distribute light from each of the first light source 601-1 and the second light source 601-2 to each of the first light entrance face 657-1 and the second light entrance face 657-2, such that the light from each of the first light source 601-1 and the second light source 601-2 is about equally combined at each of the first light entrance face 657-1 and the second light entrance face 657-2. In particular, the beamsplitter system is configured to: direct about half of the first given colour of light from first light source 601-1 to first light entrance face; direct a remaining half of the first given colour of light from first light source 601-1 to second light entrance face; direct about half of the second given colour of light from second light source 601-2 to second light entrance face; and, direct a remaining half of the second given colour of light from second light source 601-2 to first light entrance face. System 600 further comprises an optional second integrator 699 similar to integrator 399.

Light sources 601-1, 601-2 are interchangeably referred to hereafter, collectively, as light sources 601 and, generically, as a light source 601; and, mirrors 670-1, 670-2 are interchangeably referred to hereafter, collectively, as mirrors 670 and, generically, as a mirror 670.

System 600 further comprises optical components 680-1, 680-2 respectively configured to collimate light of each of first light source 601-1 and second light source 601-2. Hence, in contrast to system 300, light from light sources 601 are collimated by optical components 680-1, 680-2, which, as depicted, comprise respective sets of lenses. As light from light sources 601 are collimated, each of mirrors 670 are curved, with a curve of each mirror 670 selected so that collimated light received from beamsplitter 660 is reflected to respective light entrance faces of integrator 650.

Also depicted in FIG. 7 are light path 640-1, 640-2 of collimated light from each of light sources 601 as it is reflected and/or transmitted through beamsplitter 660, to mirrors 670 and to integrator 650. In particular, light path 640-1 is depicted in solid lines and/or with solid arrows, and light path 640-2 is depicted in broken lines and/or with open arrows.

In some implementations, system 600 can be adapted to remove optical components 680-1, 680-2 by replacing light sources 601 with light sources that produce collimated light. In other words, in such implementations, system 600 comprises a first light source and a second light source configured to emit collimated light.

Figure 8:
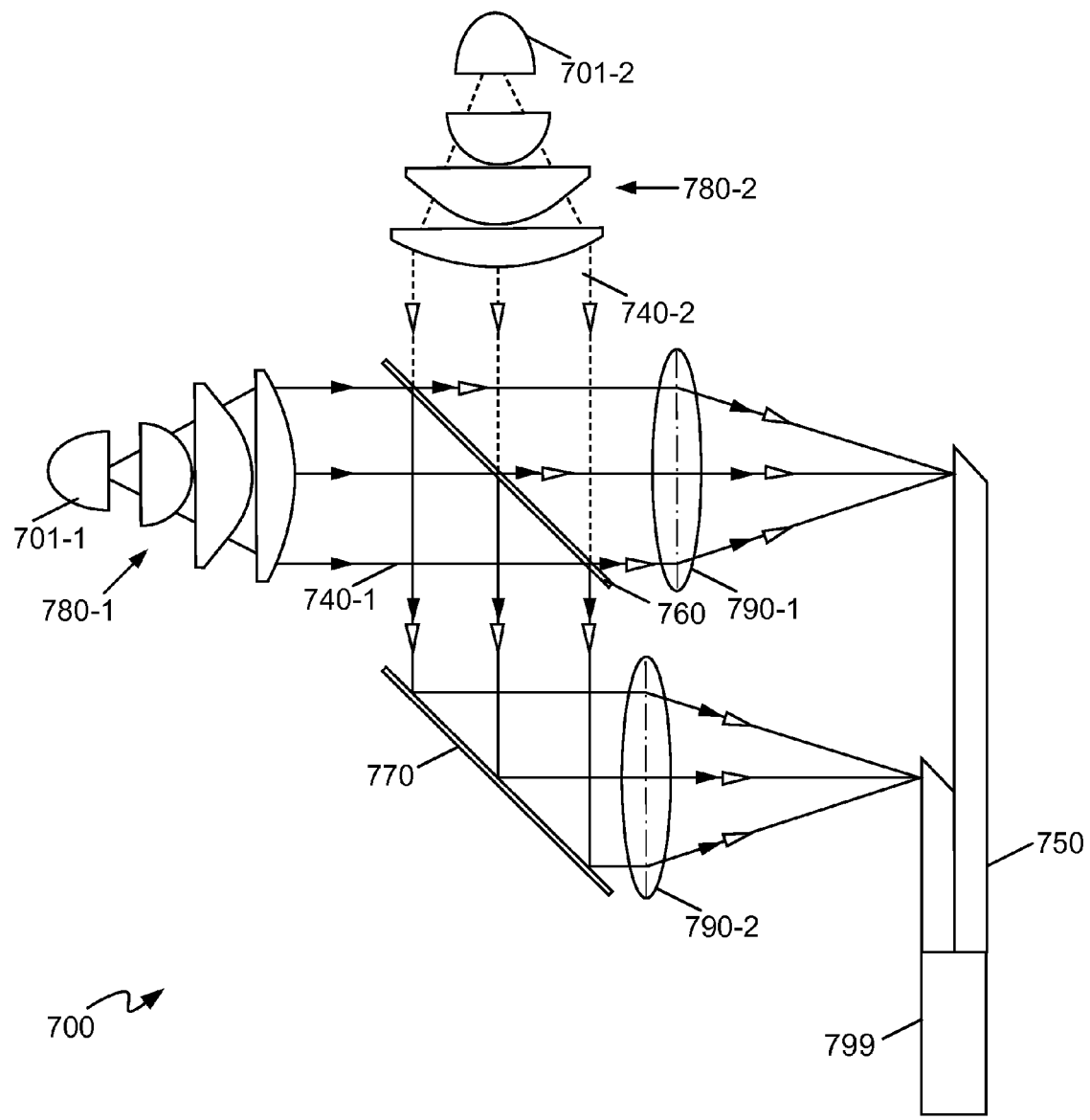
FIG. 8 depicts a schematic diagram of a light integration system, according to alternative non-limiting implementations.

Yet further alternative implementations and modifications are within the scope of present implementations. For example, present systems need not be symmetrical. As such, attention is next directed to FIG. 8 which depicts a system 700 that is substantially similar to system 300, with like elements having like numbers, however in a "700" series rather than "300" series. Furthermore, not all features of system 700 are numbered for clarity; for example, an integrator 750, similar to integrator 350 is depicted, however light entrance devices, light entrances faces, a body and a light egress end are not numbered though appreciated to be present.

In any event, system 700 comprises: a first light source 701-1 configured to emit a first given colour of light; a second light source 701-2 configured to emit a second given colour of light, the second given colour different from the first given colour, respective spectra for each of the first colour and the second colour overlapping with each other; a light integrator 750 comprising: a body configured to integrate light, body comprising a length and a light egress end; a first light entrance device comprising a first light entrance face, first light entrance device located distal light egress end; and a second light entrance device comprising a second light entrance face parallel first light entrance face; each of first light entrance device and second light entrance device configured to receive light and deflect the light into body and towards light egress end; and, a beamsplitter system which, as depicted, comprises a beamsplitter 760, a mirror 770, a first set of lenses 790-1 and a second set of lenses 790-2 (as depicted each set of lenses 790-1, 790-2 comprise one lens each), the beamsplitter system configured to: about equally distribute light from each of the first light source 701-1 and the second light source 701-2 to each of the first light entrance face 757-1 and the second light entrance face 757-2, such that the light from each of the first light source 701-1 and the second light source 701-2 is about equally combined at each of the first light entrance face 757-1 and the second light entrance face 757-2. In particular, the beamsplitter system is configured to: direct about half of the first given colour of light from first light source 701-1 to first light entrance face; direct a remaining half of the first given colour of light from first light source 701-1 to second light entrance face; direct about half of the second given colour of light from second light source 701-2 to second light entrance face; and, direct a remaining half of the second given colour of light from second light source 701-2 to first light entrance face. System 700 further comprises an optional second integrator 799 similar to integrator 399.

Light sources 701-1, 701-2 are interchangeably referred to hereafter, collectively, as light sources 701 and, generically, as a light source 701; and, first set of lenses 790-1 and second set of lenses 790-2 are interchangeably referred to hereafter, collectively, as lenses 790 and, generically, as a set of lenses 790.

In contrast to systems 300, 600, in system 700, first entrance face and second entrance face of integrator 750 face in a same direction, as in integrator 150; furthermore, first light entrance and the second light entrance are laterally displaced from one another in along a longitudinal axis of the body of integrator 750, and perpendicular an axis normal to the first light entrance face. Alternatively, the first light entrance and the second light entrance are laterally displaced from one another in a direction generally perpendicular to both a length of body of integrator 750 and an axis normal to the first light entrance face.

Furthermore, light sources 701 are positioned at about 90° from one another, such that collimated light 740-1, 740-2 from each, which is respectively collimated by optical components 780-1, 780-2 intersect at beamsplitter 760; beamsplitter 760 is positioned at about 45° to each of the beams of collimated light 740-1, 740-2 and between light source 701-1 and a first light entrance face of integrator 750. In particular, light path 740-1 is depicted in solid lines and/or with solid arrows, and light path 740-2 is depicted in broken lines and/or with open arrows. Light 740-1 transmitted through beamsplitter 760, and light 740-2 reflected by 90° from beamsplitter 760 impinges on set of lenses 790-1, which is configured to focus the collimated light onto the first light entrance face of integrator. Light 740-1 that is reflected by 90° from beamsplitter 760, and light 740-2 that is transmitted by beamsplitter 760 impinges on mirror 770 that is also at a 45° angle to transmitted light 740-2 and reflected light 740-1. Light 740-1, 740-2 received at mirror 770 is hence reflected by 90° into set of lenses 790-2, which is configured to focus the collimated light onto the second light entrance face of integrator.

Hence, the beamsplitter system of system 700 comprises beamsplitter 360, a first set of lenses 790-1 and second set of lenses 790-2, each of first set of lenses 790-1 and the second set of lenses 790-2 configured to direct respective light from beamsplitter 360 into a respective light entrance face.

Hence, components, positions and/or locations of components of system 700 are selected according to the physical configuration of integrator 750 with laterally displaced light entrance faces. Components and positions thereof are selected such that light path lengths are selected so that they are within about 30% of one another.

In each of systems 300, 600, 700 described heretofore light sources comprise one or more of lamps, elliptical lamps and the like. However, such lamps can be replaced with other types of light sources, including, but not limited to, phosphorus, quantum dots and the like.

Figure 9:
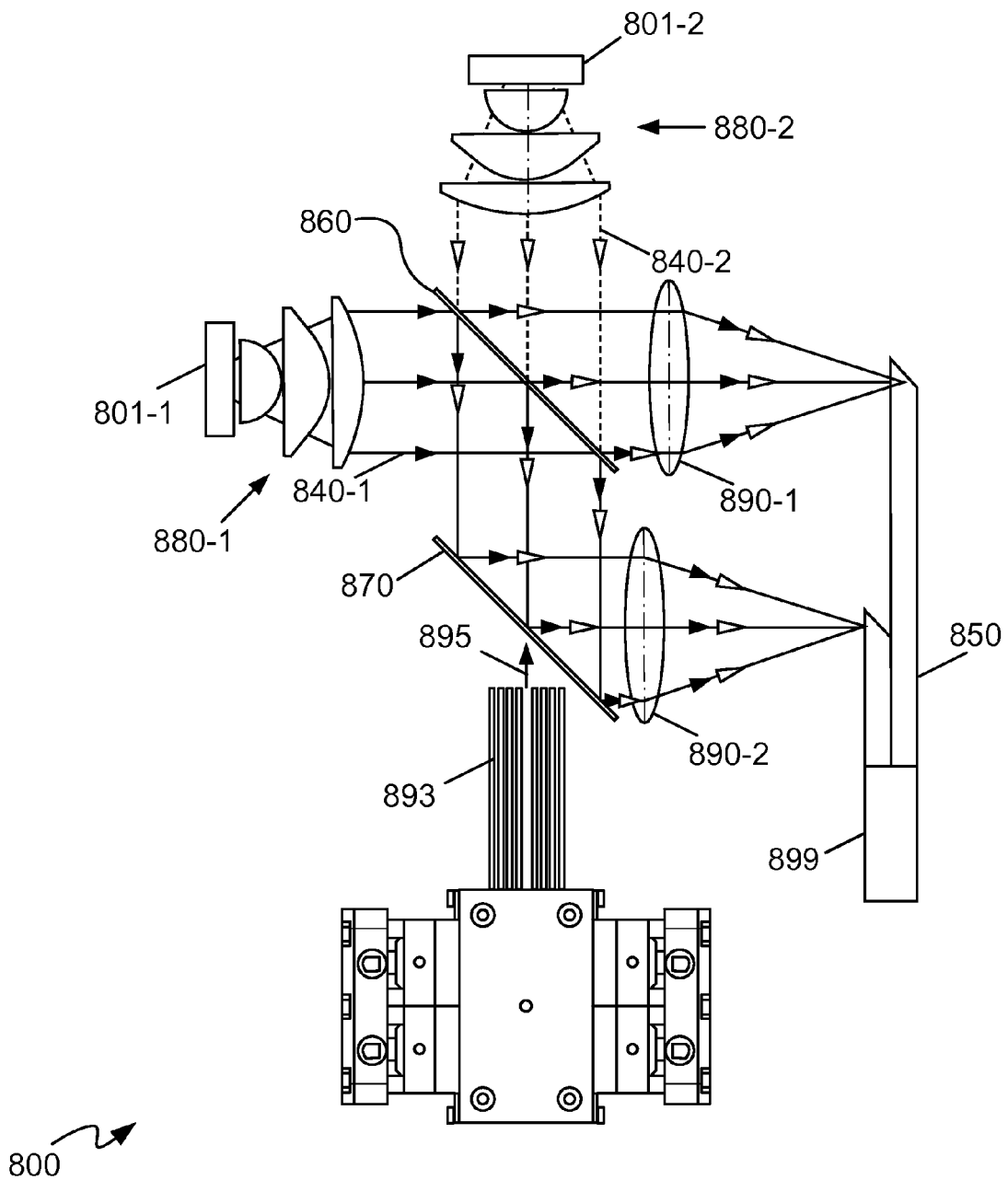
FIG. 9 depicts a schematic diagram of a light integration system, according to alternative non-limiting implementations.

For example, attention is next directed to FIG. 9 which depicts a system 800 that is substantially similar to system 700, with like elements having like numbers, however in a "800" series rather than "700" series. Furthermore, not all features of system 800 are numbered for clarity; for example, an integrator 850, similar to integrator 750 is depicted, however light entrance devices, light entrances faces, a body and a light egress end are not numbered though appreciated to be present.

In any event, system 800 comprises: a first light source 801-1 configured to emit a first given colour of light; a second light source 801-2 configured to emit a second given colour of light, the second given colour different from the first given colour, respective spectra for each of the first colour and the second colour overlapping with each other; a light integrator 850 comprising: a body configured to integrate light, body comprising a length and a light egress end; a first light entrance device comprising a first light entrance face, first light entrance device located distal light egress end; and a second light entrance device comprising a second light entrance face parallel first light entrance face; each of first light entrance device and second light entrance device configured to receive light and deflect the light into body and towards light egress end; and, a beamsplitter system which, as depicted, comprises a beamsplitter 860, a mirror 880, a first set of lenses 890-1 and a second set of lenses 890-2, the beamsplitter system configured to: about equally distribute light from each of the first light source 801-1 and the second light source 801-2 to each of the first light entrance face 857-1 and the second light entrance face 857-2, such that the light from each of the first light source 801-1 and the second light source 801-2 is about equally combined at each of the first light entrance face 857-1 and the second light entrance face 857-2. In particular, the beamsplitter system is configured to: direct about half of the first given colour of light from first light source 801-1 to first light entrance face; direct a remaining half of the first given colour of light from first light source 801-1 to second light entrance face; direct about half of the second given colour of light from second light source 801-2 to second light entrance face; and, direct a remaining half of the second given colour of light from second light source 801-2 to first light entrance face. System 800 further comprises an optional second integrator 899 similar to integrator 399.

Light sources 801-1, 801-2 are interchangeably referred to hereafter, collectively, as light sources 801 and, generically, as a light source 801; and, first set of lenses 890-1 and second set of lenses 890-2 are interchangeably referred to hereafter, collectively, as sets of lenses 890 and, generically, as a set of lenses 890.

Also depicted are light paths 840-1, 840-2, which are respectively substantially similar to light paths 740-1, 740-2. In particular, light path 840-1 is depicted in solid lines and/or with solid arrows, and light path 840-2 is depicted in broken lines and/or with open arrows.

However, in contrast to system 700, system 800 further comprises an excitation source 893 configured to emit excitation light 895 at 45° to mirror 870, and on a side of mirror 870 opposite beamsplitter 860. Mirror 870 is configured to transmit excitation light 895 and reflect light from each of light sources 801: for example, mirror 870 can comprise a dichroic mirror configured to transmit excitation light 895 and reflect light from each of light sources 801. Excitation light travels through mirror 870 to beamsplitter 860 which reflects about half of excitation light 895 towards light source 801-1 and transmits about half of excitation light 895 towards light source 801-2. Light sources 801 are each excited by excitation light 895, and emit light in response, which follows light paths light paths 840-1, 840-2 in a manner similar to that described with reference to system 700. In general, excitation light source 893 can comprise a laser light source and/or a blue laser light source, and each of light sources 801 can comprise a respective phosphor, respective quantum dots and the like, light source 801-2 configured to emit different colour light than light source 801-1.

System 300, 600, 700 and 800 further demonstrate that various beamsplitter systems are within the scope of present implementations. The system of claim 1, wherein the beamsplitter system comprises a beamsplitter and one or more optical components. For example, beamsplitter systems as described herein can comprise one or more of a 50/50 beamsplitter and a polarizing beamsplitter, and one or more optical components. Such optical components can include, but are not limited to and one or more of: at least one mirror; at least one flat mirror; at least one curved surface mirror; at least one lens; and at least one set of lenses.

In some implementations, the concepts described herein can be extended to systems having three or more light sources. For example, beamsplitter systems described herein can be adapted to distribute light from three or more light sources, at least two of which have overlapping respective spectra, to three or more light entrance faces of an integrator similar to any of integrators 150, 650, 750, 850. Indeed, the number of light sources can be more or less than a number of light entrance faces as long as there are at least two light sources and at least two light entrance faces. In some implementations, however, a number of light sources can be equal to a number of light entrance faces. When more than two light sources are used and/or more than two light entrance faces, associated beamsplitter systems can include more than one beamsplitter, the transmission and reflection properties of each selected, and the positions of each beamsplitter, as well as positions of any mirrors, selected so that light from each of the light sources is about equally distributed to each of the light entrance faces, such that the light from each of the light sources is about equally combined at each of the light entrance faces.

In any event, described herein are systems in which differently coloured light from two light sources are combined using a beamsplitter such that light impinging on respective light entrance faces of an integrator having a specific configuration is about the same; the integrator herein was described in Applicant's co-owned issued U.S. Pat. No. 8,011,815.

Persons skilled in the art will appreciate that there are yet more alternative implementations and modifications possible, and that the above examples are only illustrations of one or more implementations. The scope, therefore, is only to be limited by the claims appended hereto.

We claim:

1. A system comprising:
   a first light source configured to emit a first given colour of light;
   a second light source configured to emit a second given colour of light, the second given colour different from the first given colour, respective spectra for each of the first colour and the second colour overlapping with each other;
   a light integrator comprising: at least one body configured to integrate light, the at least one body comprising a respective length and a light egress end; a first light entrance device comprising a first light entrance face, the first light entrance device located distal the light egress end; and a second light entrance device comprising a second light entrance face parallel the first light entrance face; each of the first light entrance device and the second light entrance device configured to receive light and deflect the light into the at least one body and towards the light egress end; and,
   a beamsplitter system configured to equally distribute light from each of the first light source and the second light source to each of the first light entrance face and the second light entrance face,
   the beamsplitter system comprising a beamsplitter, a first mirror at the first light entrance face, and a second mirror at the second light entrance face,
   the beamsplitter configured to: transmit half of the first given colour of light from the first light source to the second mirror; reflect a remaining half of the first given colour of light from the first light source to the first mirror; transmit half of the second given colour of light from the second light source to the first mirror; and, reflect a remaining half of the second given colour of light from the second light source to the second mirror,
   the first mirror configured to: reflect the remaining half of the first given colour of light from the first light source into the first light entrance face; and reflect the half of the second given colour of light from the second light source into the first light entrance face,
   the second mirror configured to: reflect the half of the first given colour of light from the first light source into the second light entrance face; and reflect the remaining half of the second given colour of light from the second light source into the second light entrance face,
   such that the light from each of the first light source and the second light source is equally combined at each of the first light entrance face and the second light entrance face, the light entering both of the first light entrance face and the second light entrance face has the same characteristics with regards to at least colour and intensity.

2. The system of claim 1, wherein the beamsplitter system further comprises one or more optical components.

3. The system of claim 1, wherein the beamsplitter comprises: one or more of a 50/50 beamsplitter and a polarizing beamsplitter.

4. The system of claim 1, wherein the first light entrance face and the second light entrance face are facing in opposite directions.

5. The system of claim 1, wherein the first light entrance face and the second light entrance face are facing in a same direction.

6. The system of claim 1, wherein the first light entrance face and the second light entrance face are facing in opposite directions, and the light sources and the beamsplitter system are physically symmetric with respect to a longitudinal axis of the at least one body.

7. The system of claim 1, wherein the first light entrance and the second light entrance are laterally displaced from one another along a longitudinal axis of the respective length and perpendicular an axis normal to the first light entrance face.

8. The system of claim 1, wherein each of the first light source and the second light source are configured to emit collimated light.

9. The system of claim 1, further comprising optical components configured to collimate light of each of the first light source and the second light source.

10. The system of claim 1, wherein lengths of respective light paths from each of the first light source and the second light source to each of the first light entrance face and the second light entrance face are equal.

11. The system of claim 1, wherein etendues of each of the first light source and the second light are within 40% of one another.

12. The system of claim 1, wherein the at least one body comprises: a first body configured to convey the light from the first light entrance device towards the light egress end; and a second body configured to convey the light from the second light entrance device towards the light egress end.

13. The system of claim 1, wherein each of the first mirror and the second mirror are flat.

14. The system of claim 1, wherein light from each of the first light source and the second light source is collimated, and each of the first mirror and the second mirror is curved, a curve of each of the first mirror and the second mirror selected so that collimated light received from the beam-splitter is reflected to respective light entrance faces of the integrator.

15. The system of claim 1, wherein each of the respective spectra for each of the first colour and the second colour comprise respective peaks, and the respective peaks of the first and second colour are reduced when combined.

* * * * *